US00RE45998E

(19) United States
(12) Reissued Patent
Booth

(10) Patent Number: US RE45,998 E
(45) Date of Reissued Patent: May 10, 2016

(54) METHODS AND MOLDS FOR PRODUCING CUSTOMIZED HOT POUR PRODUCTS

(71) Applicant: Cosmetic Group USA, Inc., Sun Valley, CA (US)

(72) Inventor: Alfred E. Booth, Sun Valley, CA (US)

(73) Assignee: Cosmetic Group USA, Inc., Sun Valley, CA (US)

(21) Appl. No.: 13/728,954

(22) Filed: Dec. 27, 2012

Related U.S. Patent Documents

Reissue of:
(64) Patent No.: 8,025,266
Issued: Sep. 27, 2011
Appl. No.: 11/219,425
Filed: Sep. 2, 2005

U.S. Applications:
(63) Continuation-in-part of application No. 10/816,740, filed on Apr. 2, 2004, now abandoned.

(51) Int. Cl.

| | |
|---|---|
| ***B41B 11/62*** | (2006.01) |
| ***B29C 33/46*** | (2006.01) |
| ***A45D 40/16*** | (2006.01) |
| ***B29C 33/30*** | (2006.01) |
| *B29L 31/00* | (2006.01) |

(52) U.S. Cl.
CPC ..... *B29C 33/46* (2013.01); *A45D 40/16* (2013.01); *B29C 33/301* (2013.01); *B29L 2031/718* (2013.01)

(58) Field of Classification Search
CPC ..... A45D 40/16; B29C 33/301; B29C 33/42; B29C 33/46; B29L 2031/718
USPC ..... 249/104, 105, 119, 313, 316, 337; 425/182, 437, 447; 264/313, 316, 337
See application file for complete search history.

(56) References Cited

U.S. PATENT DOCUMENTS

| | | | | |
|---|---|---|---|---|
| 3,149,188 | A * | 9/1964 | Schmitt | 510/147 |
| D206,845 | S | 1/1967 | Ross | |
| 3,471,611 | A | 10/1969 | Scott | |

(Continued)

FOREIGN PATENT DOCUMENTS

| | | |
|---|---|---|
| EP | 0038645 | * 10/1983 |
| EP | 0191198 | * 7/1989 |

OTHER PUBLICATIONS

WooJung To World Products Catalog, Design (Customized) Hot Pouring Machine, pp. 14/15, date unknown.

(Continued)

*Primary Examiner* — Timothy J Kugel
(74) *Attorney, Agent, or Firm* — Foley & Lardner LLP

(57) ABSTRACT

A mold and a process for preparing a customized hot pour product formed of a hot pour material. The process comprises the steps of providing a mold having a top part with a pour space and a base part, applying hot pour material into the mold through the pour space and allowing the hot pour material to cool, removing the top part of the mold to provide a first exposed surface, and releasing the base part to provide a second exposed surface. The mold may be customized to include inserts, removable members, projections, recesses, and combinations thereof in the base part and/or top part, thereby providing for a hot pour product with one or more exposed surfaces that are embossed, debossed, or both.

30 Claims, 9 Drawing Sheets

(56) References Cited

U.S. PATENT DOCUMENTS

| | | | | | |
|---|---|---|---|---|---|
| 3,534,440 | A | * | 10/1970 | Roberts | 425/195 |
| 3,552,402 | A | | 1/1971 | Levy | |
| 3,841,822 | A | | 10/1974 | Putzer et al. | |
| 3,871,611 | A | * | 3/1975 | Taketa | 249/102 |
| 3,991,146 | A | * | 11/1976 | Barrie | 264/46.7 |
| 4,421,127 | A | | 12/1983 | Geer | |
| 4,538,725 | A | | 9/1985 | Glover et al. | |
| 4,676,475 | A | * | 6/1987 | Grandin et al. | 249/105 |
| 4,776,356 | A | | 10/1988 | Jou et al. | |
| 4,853,222 | A | | 8/1989 | Avalle | |
| 4,994,288 | A | * | 2/1991 | Graham et al. | 426/249 |
| 5,086,791 | A | | 2/1992 | Ferrari | |
| 5,087,188 | A | * | 2/1992 | Staver | 425/116 |
| 5,107,871 | A | | 4/1992 | Butcher et al. | |
| 5,108,667 | A | * | 4/1992 | Kamen et al. | 264/446 |
| 5,316,712 | A | * | 5/1994 | Ono et al. | 264/102 |
| 5,325,961 | A | | 7/1994 | Ford et al. | |
| 5,702,713 | A | | 12/1997 | Joulia | |
| 5,713,471 | A | | 2/1998 | Gueret | |
| 5,813,420 | A | | 9/1998 | Sussman | |
| 5,861,165 | A | | 1/1999 | Joulia | |
| D407,855 | S | | 4/1999 | Orsomando | |
| D411,648 | S | | 6/1999 | Markham | |
| 5,928,655 | A | | 7/1999 | Avalle | |
| 5,934,773 | A | | 8/1999 | Ferrell | |
| 6,004,541 | A | | 12/1999 | Avalle | |
| 6,022,209 | A | | 2/2000 | Kuo | |
| 6,080,424 | A | | 6/2000 | Avalle | |
| D436,693 | S | | 1/2001 | Thorpe et al. | |
| 6,319,446 | B1 | * | 11/2001 | Bettencourt | 264/225 |
| 6,372,232 | B1 | | 4/2002 | Avalle | |
| 6,484,731 | B1 | | 11/2002 | Lacout | |
| D468,868 | S | | 1/2003 | Thorpe et al. | |
| D469,223 | S | | 1/2003 | Thorpe et al. | |
| 6,554,246 | B1 | * | 4/2003 | Nadakatti et al. | 249/104 |
| D477,895 | S | | 7/2003 | Goswell | |
| D480,837 | S | | 10/2003 | Liu | |
| 6,630,092 | B2 | | 10/2003 | Avalle | |
| D482,498 | S | | 11/2003 | Jeong | |
| 6,780,362 | B1 | * | 8/2004 | Story et al. | 264/219 |
| D498,879 | S | | 11/2004 | Martinez | |
| 2001/0031271 | A1 | | 10/2001 | Avalle | |
| 2002/0036155 | A1 | | 3/2002 | Freeman et al. | |
| 2002/0086079 | A1 | | 7/2002 | Kuo | 425/405.1 |
| 2002/0086081 | A1 | | 7/2002 | Kuo | |
| 2002/0121284 | A1 | | 9/2002 | Avalle | |
| 2005/0218560 | A1 | | 10/2005 | Booth | |
| 2006/0027481 | A1 | | 2/2006 | Gelardi et al. | |

OTHER PUBLICATIONS

Thirteen photographs of lipstick mold and physical mold provided to Examiner for inspection on or about Sep. 2, 2015. The lipstick mold was obtained by Applicant prior to the Dec. 27, 2012 priority filed of the present application.

* cited by examiner

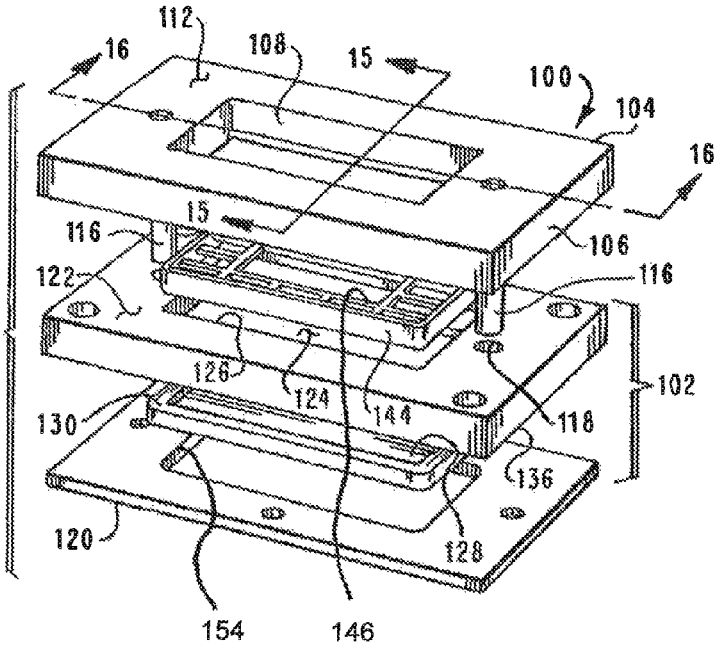
FIG. 14
AMENDED
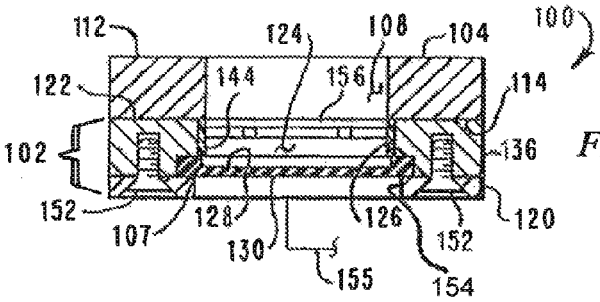
FIG. 15
AMENDED
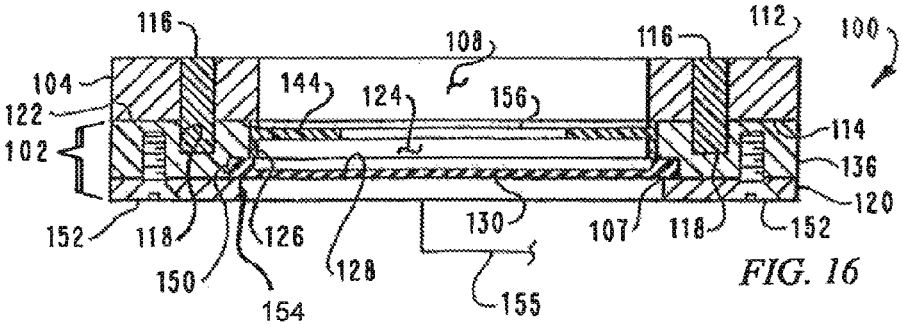
FIG. 16
AMENDED

AMENDED

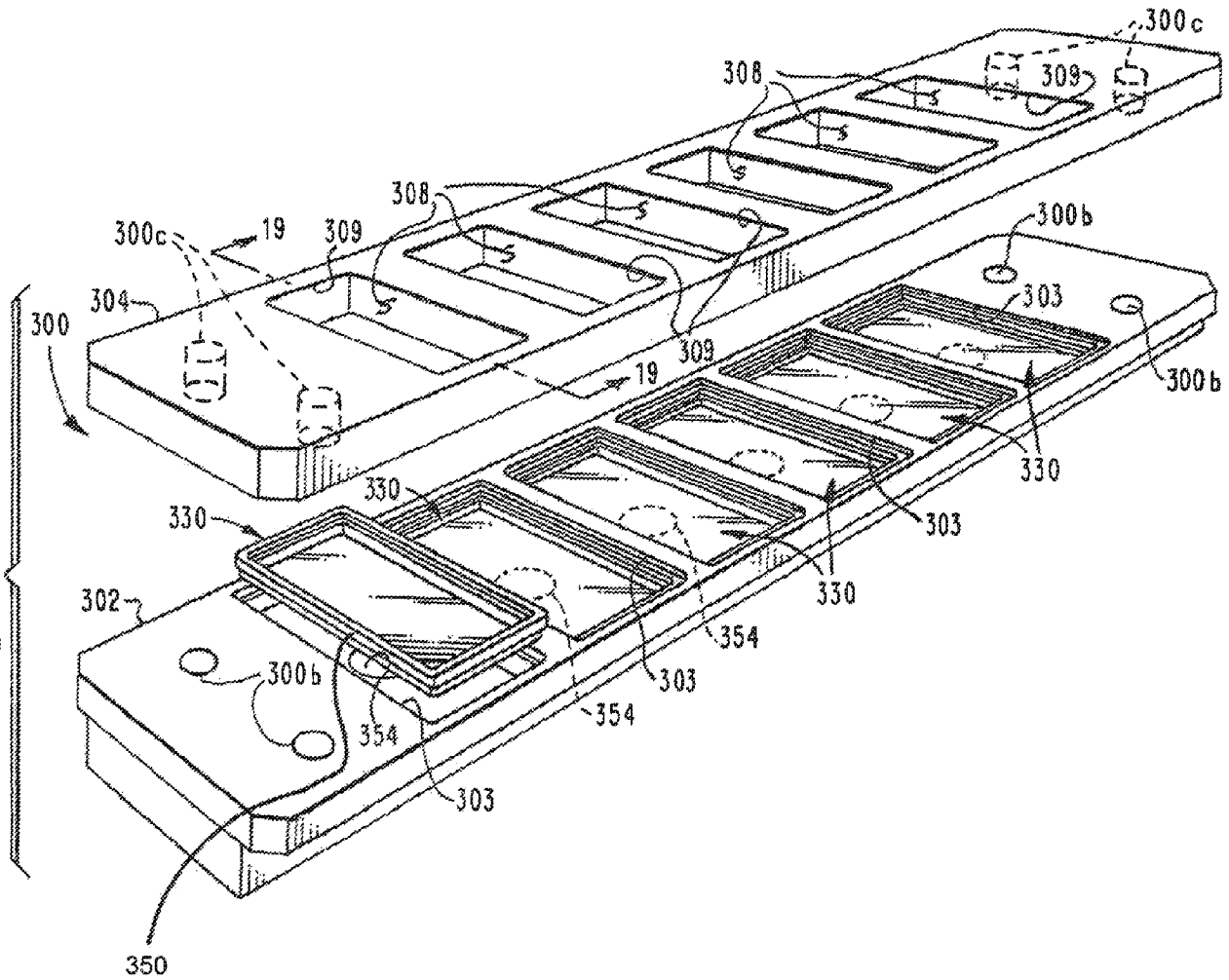
FIG. 18
AMENDED

METHODS AND MOLDS FOR PRODUCING CUSTOMIZED HOT POUR PRODUCTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation-in-part of U.S. patent application Ser. No 10/816,740, filed on Apr. 2, 2004, herein incorporated by reference.

BACKGROUND OF THE INVENTION

The present invention relates to improvements in hot pour technology, more specifically, these improvement provide ready to use customized products, and, in particular, an improved method of hot pouring such materials to form customized products.

Prior art hot pour technology requires hot pour materials (such as, in particular, for cosmetics made available in compact form) to be poured into a first receptacle and then transferred by gravity or pressure poured into another receptacle (e.g., the cosmetic receptacle). As such, the poured material for use in a compact generally has a concave (recessed) viewing surface without any distinctive or customized features, such as embossed or debossed surfaces or the ability to produce such. In addition, such surfaces are often uneven and inconsistent. Any customization of such materials or products, such as the creation of designs on the viewing surface of the material requires additional and complicated steps that normally rely on computers, lasers, and other equipment. Such customization techniques are not only complicated and costly (e.g., requiring costly equipment), they often produce inconsistent results. Clearly, then, there remains a need to provide a more economical and efficient method of producing hot pour materials with consistent and even surfaces as well as providing hot pour products that may be customized with ease and efficiency and ready for use.

SUMMARY OF THE INVENTION

The present invention solves the current problem associated with current costly and inefficient methods of producing and customizing hot pour materials and products. For example, the present invention provides improved hot poured materials, such as cosmetic articles and the like, and a mold and process for providing the same.

In one embodiment, the present invention provides a process for preparing a customized, ready-to-use hot pour product, such as a but pour cosmetic article or the like, comprising the steps of providing a mold for casting hot pour material in a fluid state, the mold having a top part and a base part and at least one interior cavity formed thereby with at least one pour space in the top part, applying hot pour material into the mold though the pour space into at least one interior cavity and allowing the hot pour material to cool, removing the top part of the mold such that a portion of the hot pour material is in contact with the base part and wherein a portion of the hot pour material provides a first exposed surface, and releasing the hot pour material from the base part to provide a second exposed surface, thereby providing a ready-to-use hot pour product. When desired, the first as well as second exposed surfaces may include customized portions that are embossed, debossed, or both.

A portion of the process or the process in its entirety may be automated. Further, the process may include applying more than one hot pour material, each material poured at the same time or at different times. Each hot pour material may differ in color, composition, or both. "Hot pour material" as described herein is any material capable of being formed in a hot pour process and provides a final product. The introduction of pressure fluid to release the hot pour material may take advantage of a number of release techniques known to one of ordinary skill in the art. Preferably, pressure fluid is applied evenly through the base part and/or top part of the mold to provide for an even ejection force.

The present invention also provides a mold for preparing a customized hot pour product, the mold being capable of receiving a hot pour material, such as a cosmetic article or the like, and comprises a top part with a pour space and a base part with at least one customized mold portion. The base part further comprises some or all of the following: outer rim, inner rim, base surface, and one or more interior base chambers or cavities, bottom walls, conduits or passages, and customized mold portions, such as removable members and inserts, in which the customized portions may be shaped, multi-elevational, raised as a projection, and/or sunken as a recess or combinations thereof to provide for a hot pour product that is embossed, debossed, or both. The mold top (i.e., top part) may include similar customized mold portions and/or pressure fluid passages, as well as a perimeter wall, a planar surface, and one or more pour spaces as needed. Each pour space may be large enough to encompass a predominant portion of the top part.

The mold may further include more than one cavity as well as one or more desired inserts and/or removable members, any of which may be of any shape having recesses, projections or both, as desired, to provide for an overall design that is uniform or non-uniform. Mold, insert, cavity and removable member shapes need not be the same. Examples of useful shapes include number, letter, word, cylinder, sphere, polygon, palette, or combination thereof, as examples. Upon removal from the mold, a shaped material provided by a mold of the present invention may be further transferred to a receptacle of a similar shape or one that is different.

The present invention may be used with any number of hot pour materials, including cosmetic articles for lips, eyes, face, etc. (e.g., lipstick, lip gloss, eye wear, pomade and their components and packaging). In addition, the material and product formed therefrom may be placed in one or more sampling devices and may even be used for product promotion or as handouts. Examples of promotional means or handouts include magazine inserts, postcards, department store catalogs, and customer mailings. In the cosmetic industry, examples of receptacles include pans, compacts, godets, tubes, bottles, jars, flasks, and boxes. Other suitable receptacles are also used.

An advantage of the present invention includes its availability and use with applied technology processes, such as dispensing and dosing systems and devices. As such, it may be used with automated or semi-automated systems and/or with multiprocessing equipment (e.g., equipment for feeding, preheating, filling, post heating, refrigerating, and collating). The present invention enables such hot pour products to be produced in a consistent and less costly fashion, and is readily customizable as needed.

Those skilled in the art will further appreciate the above-noted features and advantages of the invention together with other important aspects thereof upon reading the detailed description that follows in conjunction with the drawings.

BRIEF DESCRIPTION OF THE DRAWINGS

For more complete understanding of the features and advantages of the present invention, reference is now made to the detailed description of the invention along with the accompanying figures, wherein:

FIG. 14 is an exploded perspective view of another embodiment of a mold of the present invention;

FIG. 15 is a section view taken along line 15-15 of FIG. 14;

FIG. 16 is a section view taken along line 16-16 of FIG. 14;

FIG. 18 is an exploded perspective view of still another embodiment of a mold of the present invention;

DETAILED DESCRIPTION OF THE INVENTION

Figure 1:
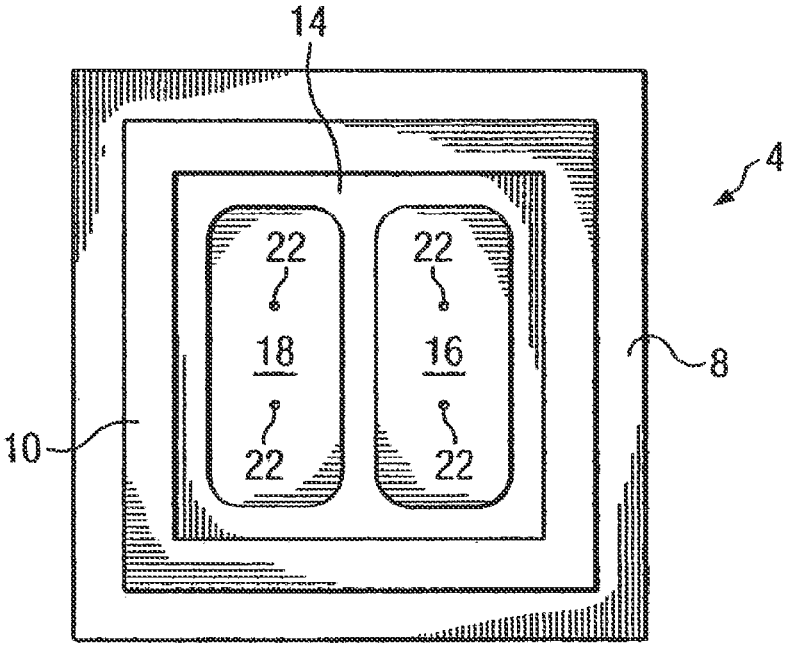
FIG. 1 depicts a top plan view of the bottom or base part of a mold of the present invention.

Although making and using various embodiments of the present invention are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention.

In the description which follows like parts are marked throughout the specification and drawing with the same reference numerals, respectively. The drawing figures are not necessarily to scale and certain features may be shown exaggerated in scale or in a somewhat generalized or schematic form in the interest of clarity and conciseness.

Figure 4:
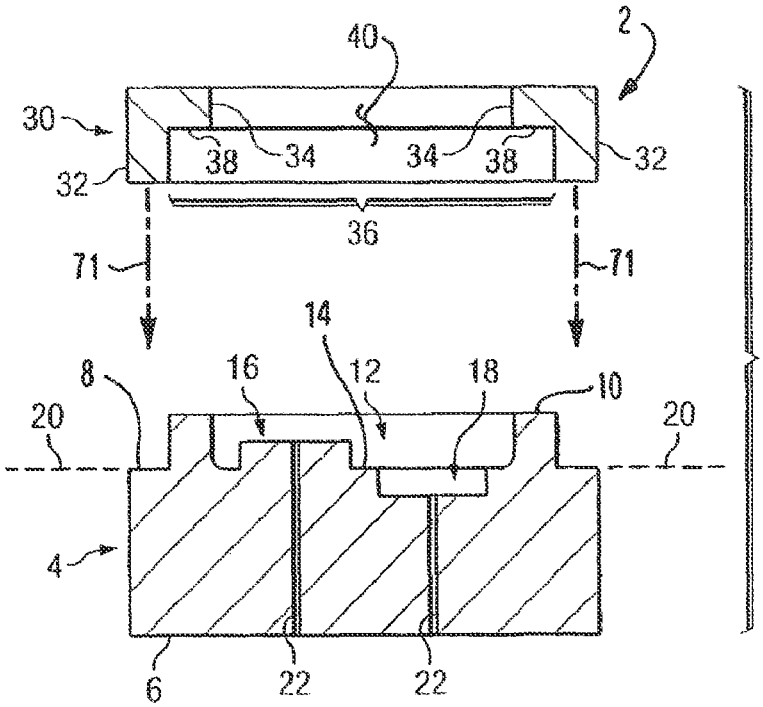
FIG. 4 is a section view of the top and base parts of a mold of the present invention, shown separated from each other.

Now referring to FIGS. 1 and 4, an example of a mold 2, FIG. 1, in accordance with the invention is illustrated with respect to a base part 4. Generally, the exemplary base part 4 is a shaped block having a bottom wall 6, an upward facing continuous, planar outer rim 8, an inner rim 10, at least one interior base chamber or cavity 12 delimited by a base surface 14. (See FIG. 4) The outer rim 8 is of a different, often lower, elevation than the inner rim 10. Likewise, the inner rim 10 is generally of a different elevation than the base surface 14 and delimits the top of the base part 4. The base surface 14 and/or inner rim 10 will generally include one or more projections 16 (e.g., raised or debossed portions) one shown, as well as one or more recesses 18 (e.g., sunken or embossed portions) one shown, with respect to a baseline 20. (See FIG. 4) Baseline 20 may be coplanar with outer rim 8. The base surface 14 may include only projection 16 or only recess 18. The projection 16 and/or recess 18 may be of various configurations or combinations of configurations, and generally provides for a product that is shaped, such as in a uniform design, nonuniform design, letter(s), and/or word(s) with viewing surfaces that are embossed, debossed or both. One or more pressure fluid passages 22 are located at various positions in bottom wall 6 and extend between bottom wall 6, opening into one or more interior base chambers or cavities 12. Pressure fluid passages 22 open generally into the interior base chamber or cavity 12 at projections 16 and recesses 18; however, the pressure fluid passages may be disposed in other locations opening into interior base chamber 12.

FIG. 1 shows a base part 4 that is square in shape. Similarly, the figure shows a square-shaped outer rim 8, square-shaped inner rim 10, and square-shaped base surface 14. Any alternative shape may be used for the base part 4, outer rim 8, inner rim 10, and base surface 14. In one embodiment of the base part 4, the outer rim 8, inner rim 10, and base surface 14 are the same shape. Alternatively, the outer rim 8, inner rim 10, and base surface 14 may be of different shapes. Shapes include but are not limited to a rectangle, triangle, sphere, polygon, and combinations thereof. The shape may be a design that is uniform or non-uniform, and may include letters and/or words, as examples.

Figure 2:
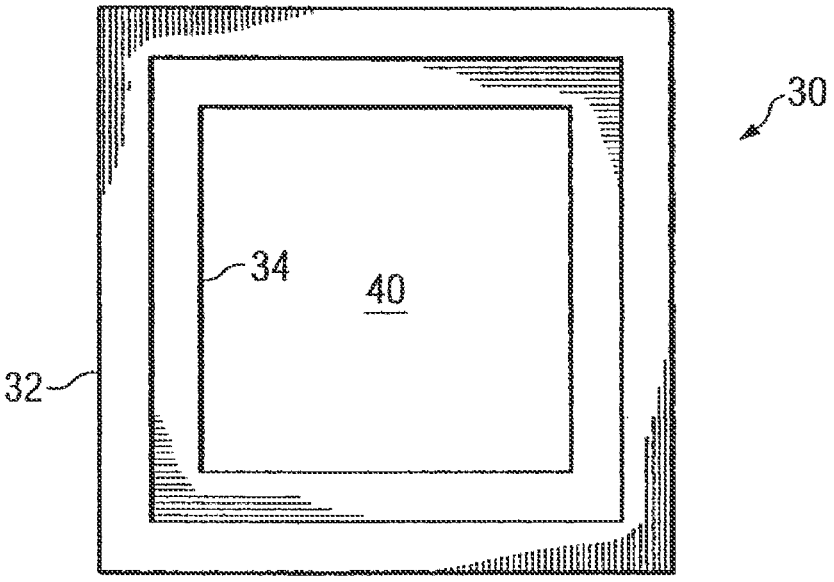
FIG. 2 depicts a bottom plan view of the top part of a mold of the present invention.

Now referring to FIG. 2, there is illustrated an example of a top part 30 of a mold of the present invention. Generally, the top part 30 comprises a perimeter wall 32 delimited by a planar surface 34, and at least one pour space 40. A recess 36, as shown in FIG. 4, is formed in top part 30 between surface 34 and a perimeter ledge or shoulder 38 and opens to the pour space 40. Optionally, the top part 30 may also include pressure fluid passages as needed (not shown). While FIG. 2 shows the top part 30, perimeter wall 32, and surface 34 to be rectangular in shape, any alternative shape may be used. Shapes include one or more of the shapes described above (e.g., rectangle, triangle, sphere, polygon, uniform design, non-uniform design, letter, word, and combinations thereof). In the embodiment shown in FIG. 2, the perimeter wall 32, planar surface 34, and pour space 40 are the same shape. Alternatively, the perimeter wall 32, planar surface 34, and pour space 40 may be of different shapes. The perimeter wall 32 of the top part 30 is often the same shape as the outer rim 8 of the base part 4; however, the perimeter wall 32 (of the top part 30) and the outer rim 8 (of the base part 4) may be of different shapes. Likewise, the planar surface 34 of the top part 30 are often the same shape as the inner rim 10 of the base part 4, but may be of different shapes.

When referring to the top part 30, as shown in FIG. 2, the perimeter wall 32 and surface 34 may or may not be continuous. When not continuous, they comprise separate parts that are in close contact with one another. As shown in FIG. 2, the perimeter wall 32 and surface 34 are of different elevations. Generally, the perimeter wall 32 of top part 30 fits the outer rim 8 of base part 4. Similarly, surface 34 of top part 30 fits inner rim 10 of the base part 4. Surface 34 may, however, include a larger surface than shown (e.g., wider). In such a case, pour space 40 of top part 30 will be dimensionally smaller. In addition, top part 30 may have more than one pour space 40. Top part 30 may also comprise one or more recesses, projections and/or pressure fluid passages. The shape and design of such projections and/or recesses may help determine the number and location of pour spaces.

Figure 3:
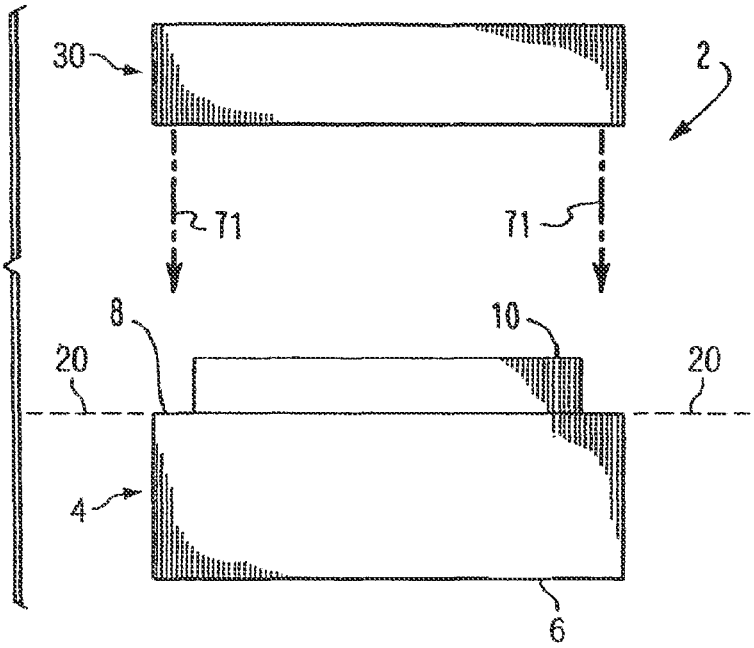
FIG. 3 depicts a side elevation view of the top and base parts of a mold of the present invention, wherein the top and base parts of the mold are separated from each other.

FIGS. 3 and 4 illustrate how top part 30 and base part 4 of a mold engage each other. Arrows 71 in FIGS. 3 and 4 show how the top part 30 is positioned in order to engage it to base part 4. FIG. 4 shows pour space 40 of top part 30 as well as projection 16, recess 18, and pressure fluid passages 22 of base part 4. Top part 30 also includes a shoulder or perimeter ledge 38 that contacts base part 4 of the mold of the present invention, dimensions of which will vary depending on, for example, the shape of the mold and on the number and extent of projections and/or recesses. Consequently, pour space 40 may be narrower or wider than shown, depending on the dimensions of shoulder or perimeter ledge 38.

Figure 5:
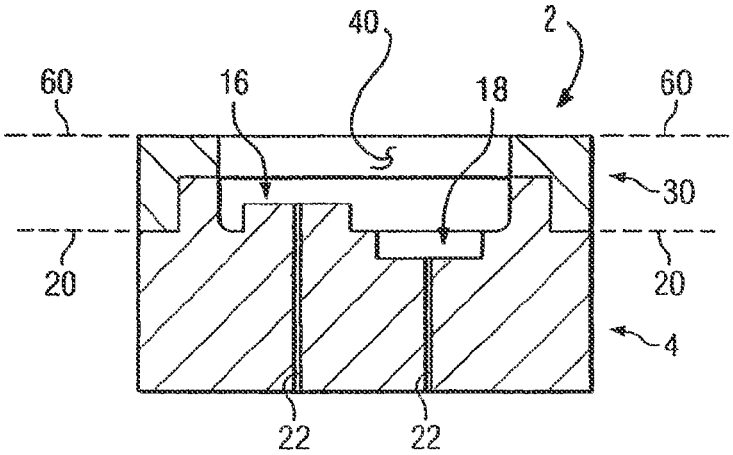
FIG. 5 is a section view of the top and base parts of a mold of the present invention, wherein the top and base parts are connected.
Figure 6:
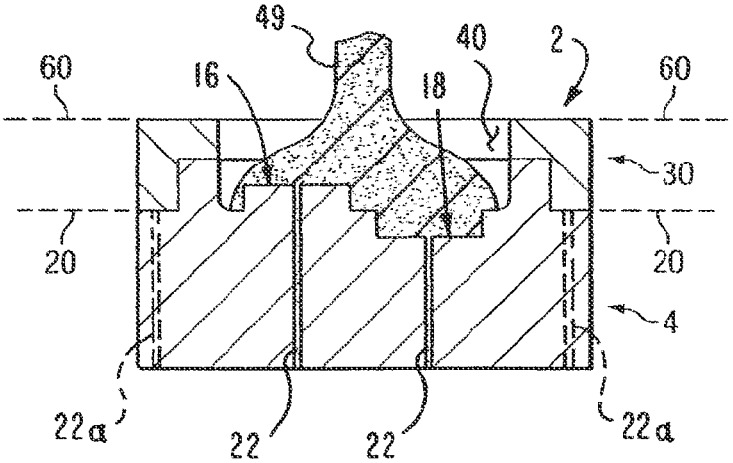
FIG. 6 is a section view of a mold of the present invention showing the step of pouring a hot pour material through the top part of the mold.

Generally, the method of introducing a hot pour material to a mold of the present invention to form a product, such as a cosmetic article or the like, comprises the steps of setting up a mold 2 with top part 30 and base part 4 tightly engaged (FIG. 5), adding hot pour material (HPM) 49 (FIG. 6) to the mold, such as mold 2, to form a hot pour product 50 (herein HPP 50). Hot pour material 49 is added to mold 2 through one or more pour spaces 40 to a fill level 60. HPP 50 is allowed to cool to a hot pour consistency using cooling techniques known to one of ordinary skill in the art. As shown in FIGS. 5 and 6, fill level 60 is coplanar with perimeter wall 32 of top part 30. Other alternatives may be equally advantageous depending on the desired end product.

Figure 7:
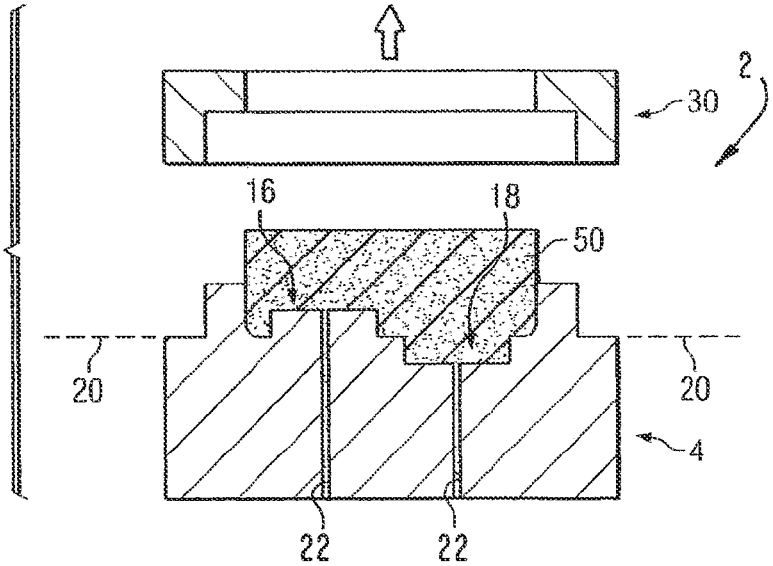
FIG. 7 is a section view showing the step of removing the top part from the base part of a mold of the present invention.
Figure 8A:
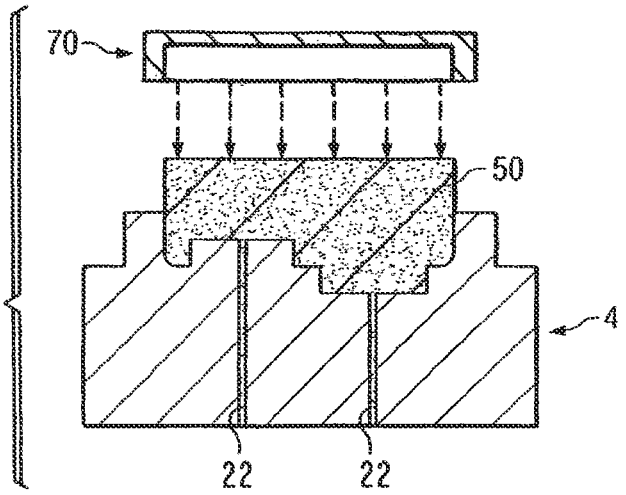
FIGS. 8A and 8B depict section views showing positioning and placement of a receptacle on the hot pour product while still in the mold base or bottom part.
Figure 8B:
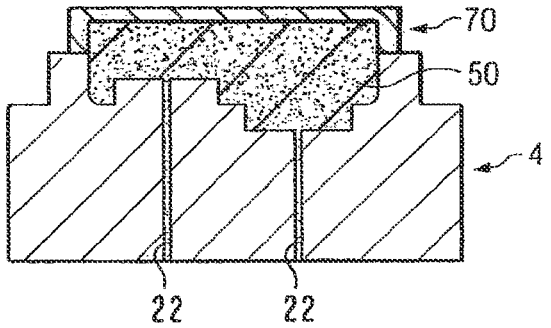
Figure 9:
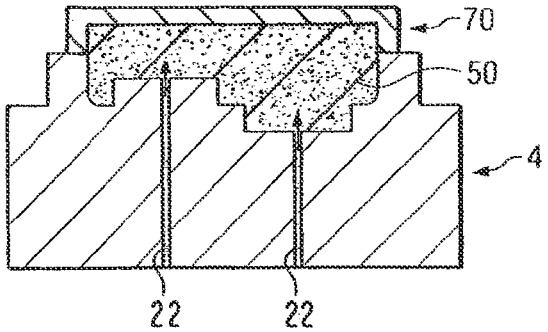
FIG. 9 is a section view showing the step of introducing pressure fluid through the base part of a mold of the present invention.
Figure 10:
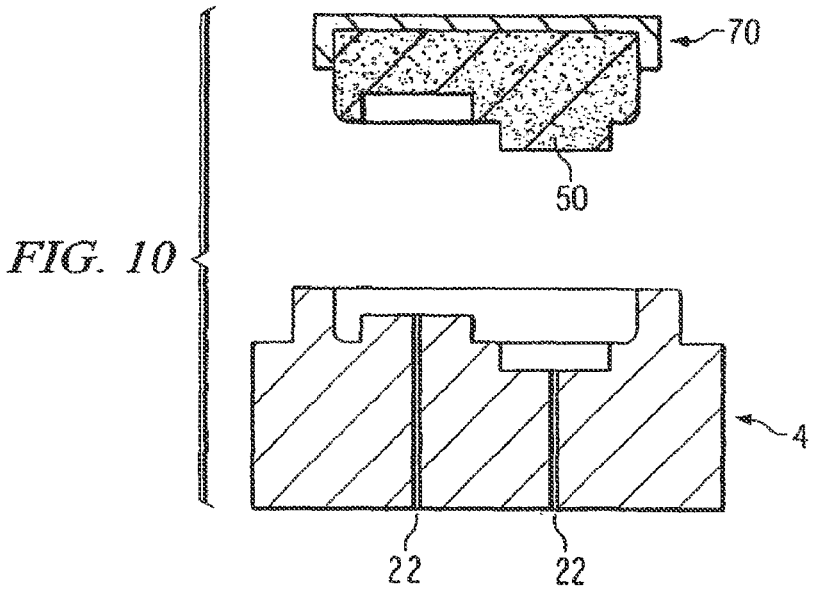
FIG. 10 is a section view showing the step of removing a hot pour product from a base part of the mold of the present invention.

Upon cooling of HPP 50, top part 30 of mold 2 is removed carefully, generally by moving upward relative to base part 4 (as shown in FIG. 7). A first pan or receptacle 70 replaces top part 30 of mold 2 (as shown in FIGS. 8A and 8B). HPP 50, in contact with first receptacle 70, is released from base part 4 by introducing pressure fluid, such as compressed air, through one or more pressure fluid passages 22 (as shown in FIGS. 9 and 10) providing the HPP 50 in contact with first receptacle 70, wherein HPP 50 displays one or more projection [16] *16a* and/or one or more recess [18] *18a* (as shown in [FIG. 11] *FIGS. 11A and 11B*).

As shown in FIGS. 5 and 6, the highest elevation for baseline 20 of base part 4 is lower than projection 16 and higher than recess 18 of mold 2. Other embodiments may provide for one or more projection 16 and/or one or more recess 18 of base part 4 to be higher than the highest elevation of the baseline 20. In addition, peak portions of projection 16 may be near or coplanar with fill level 60. Furthermore, fill level 60 may be coplanar with the uppermost surface of top part 30, as shown in FIGS. 5 and 6. An alternative embodiment includes a fill level that is not coplanar with the uppermost surface of top part 30.

Removal of top part 30 of mold 2 from base part 4 after HPP 50 has cooled, as shown in FIG. 7, may be performed mechanically or by hand. In some instances, pressure fluid, such as air, introduced through pressure fluid passages 22a (FIG. 6) may used to remove the top part 30 from base part 4. The addition of a first receptacle 70 to the cooled HPP 50, as shown in FIGS. 8A and 8B, may also be performed mechanically or manually. Similarly, the first receptacle 70 may be introduced into a second receptacle 72, as shown in FIG. 11B. Mechanical techniques, as used herein and throughout the specification are those known to one of ordinary skill in the art and may be automated.

Figure 11A:
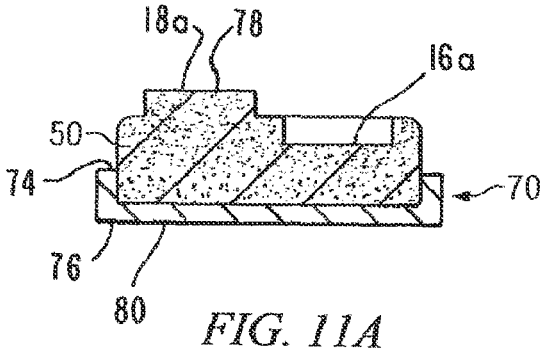
FIG. 11A is a section view of a hot pour product in a receptacle following its transfer from a mold of the present invention, wherein the hot pour product extends above the side edge of the receptacle.
Figure 11B:
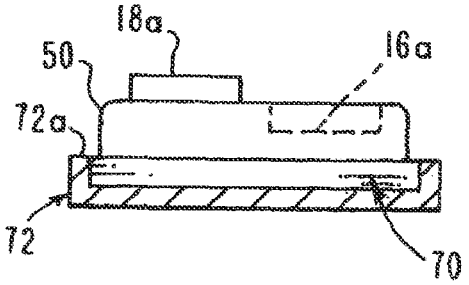
FIG. 11B is a side elevation view of [n] *a* hot pour product in a side elevation, partially sectioned, wherein the hot pour product is in a first receptacle which is disposed in a second receptacle.
Figure 12:
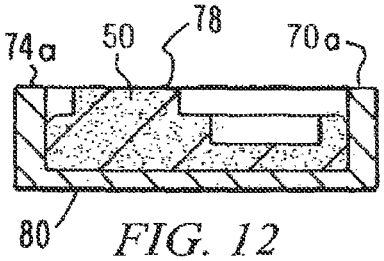
FIG. 12 is a section view of a hot pour product in a receptacle following its transfer from a mold of the present invention, wherein the hot pour product is disposed with its upper surface coplanar with a top edge of the receptacle.
Figure 13:
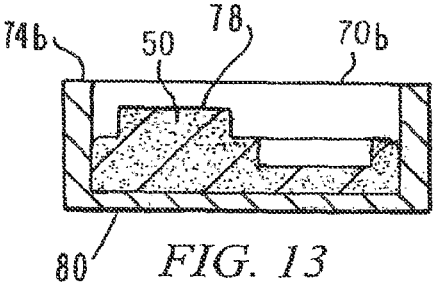
FIG. 13 is a side elevation view of a hot pour product in a receptacle following its transfer from a mold of the present invention, wherein the hot pour product is disposed substantially within the receptacle.

As shown in FIG. 11A, HPP 50 projects above the uppermost surface 74 of a receptacle 70. Alternate embodiments include arrangements where a top surface of formed HPP 50 is either coplanar with a top cooperative surface 74a of receptacle 70a, as shown in FIG. 12, or below an uppermost surface 74b of a receptacle 70b, as shown in FIG. 13. The surfaces 74, 74a or 74b of receptacles 70, 70a, and 70b may be a continuous, discontinuous and/or shaped with respect to the complementary surface of HPP 50. In addition, portions of the complementary surface of HPP 50 may remain exposed, thus, absent of contact with any portion of a first receptacle. A similar occurrence is possible with a second receptacle 72 (FIG. 11B). For example, first receptacle 72 may be contiguous with a cooperative surface of HPP 50 or with the upper surface of second receptacle 70, as shown, or it may be above or below these surfaces. In addition, second receptacle 72 may have all or only a portion of its surface in contact with the first receptacle and/or a hot pour product.

Accordingly, the process as provided herein includes the provision of a two part mold with a top part and a base part that engage to form at least one interior cavity capable of receiving at least one hot pour material. The top part generally comprising all, some, and at least one or more of the following: pour space, perimeter wall, planar surface, conduit or passage, and/or customized mold portion, including insert, removable member, projection, and/or recess, such that the customized portions are either raised as a projection, sunken as a recess or combinations thereof to provide for a hot pour product that is embossed, debossed, or both. Recesses and projections may reside on any portion of the top part capable of contacting a portion of at least one hot pour material, including the at least one perimeter wall, planar surface and/or pour space.

The base part generally comprise all or some of the following, including at least one of the following: outer rim, inner rim, base surface, interior base chamber or cavity, bottom wall, conduit or passage, insert and customized mold portion, including insert, removable member, projection, and/or recess, such that the customized portions are either raised as a projection, sunken as a recess or combinations thereof to provide for hot pour product that is embossed, debossed, or both. The customized mold portion may reside on any portion of the base part capable of contacting a portion of at least one hot pour material including the at least one outer rim, inner rim, base surface, interior base chamber or cavity, bottom wall, and/or insert. A removable member of the base part may have customized mold portions as desired. The removable member(s) may remain part of the final customized hot pour product or be removed prior to product use.

The process of the present invention typically includes release of the hot pour product from the mold. The product is typically released into a receptacle capable of receiving a hot pour product (e.g., cosmetic article or the like), such as case, compact, godet, box, or equivalent. Examples of suitable materials for a receptacle include plastic, a hardened polymer or polymer blend, glass, fibrous material, or metal, wherein the receptacle may be transparent or opaque. The receptacle is typically placed in contact with all or a portion of a first exposed surface.

The process may also include a step of contacting a second receptacle. The second receptacle may contact either the first receptacle and/or portions of the first exposed surface or contact all or portions of a second exposed surface. Accordingly, the process provides for a ready-to-use product comprising one or more hot pour materials having one or more customized portions with at least one exposed surfaces, each surface typically customized with one or more embossments, debossments or both.

Figure 17:
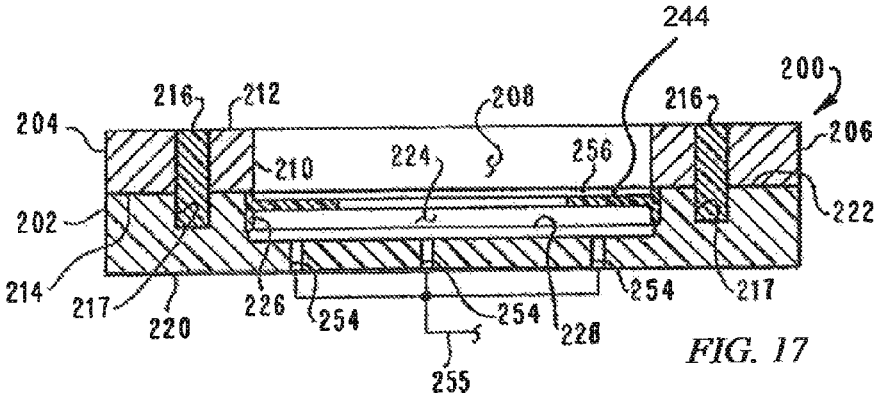
FIG. 17 is a section view of yet another embodiment of a mold of the present invention.
Figure 21:
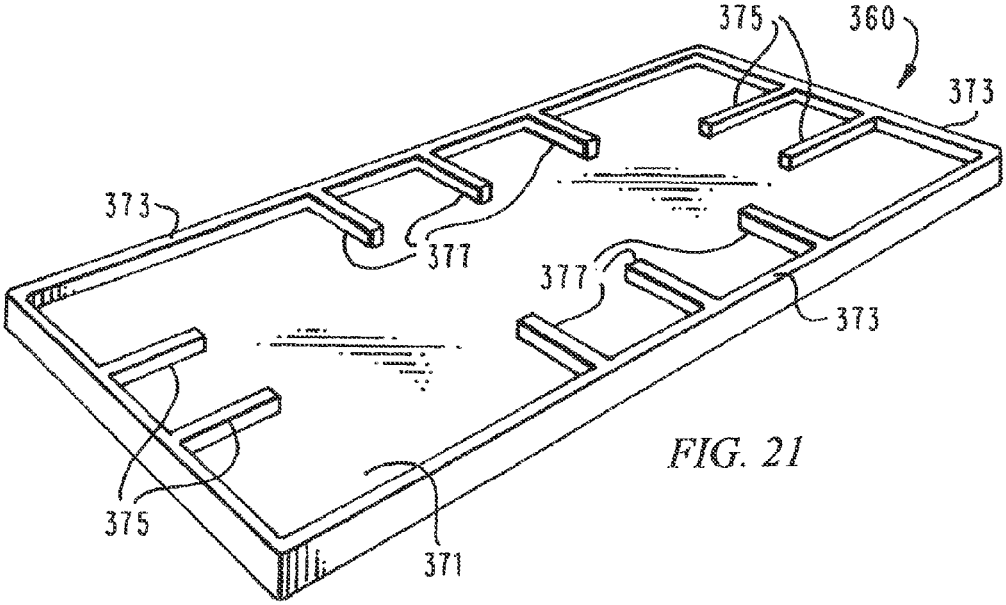
FIG. 21 is a plan view of a receptacle for a hot pour product in accordance with another aspect of the present invention.

A mold in accordance with the present invention may comprise alternate embodiments, such as that shown in the exploded perspective view of mold 100 in FIG. 14 or in the section view of mold 200 in FIG. 17 or in the exploded perspective view of mold 300 in FIG. 18. Such molds of the present invention may include, additionally, an insert patterned and shaped for placement inside the mold as shown with insert 144 of FIG. 14 as well as a pan or receptacle patterned [a] *and* shaped for placement on a hot pour product as shown with pan [502] *360* of FIG. 21. Similar inserts and pans may be patterned and shaped to be provided with other embodiments of the present invention, when not depicted in the figure.

Referring to FIGS. 14, 15 and 16, the mold 100 includes a shaped top part 104 and shaped multi component base part 102. Top part 104 and base part 102 may be any desired shape, such as rectangular, square, triangle, sphere, polygon, and combinations thereof, and may also include a uniform or nonuniform shape, such as one shaped to resemble one or more letters, numbers, or words. As with mold 2, multiples of mold 100 may be aligned in series for multi-mold processing. Alternatively, a top part and base part of a mold of the present invention may be shaped with features that permit multi-well processing in a single mold, as depicted in FIG. 18 showing top part 304 and base part 302.

Referring still to FIGS. 14, 15, and 16, top part 104 typically comprises a perimeter wall 106 and at least one pour space 108 bounded by at least one planar surface 110. Planar surface 110 may be shaped, angled or perpendicular to an x-axis formed by lines 15-15 or lines 16-16 as depicted in FIG. 14. Top part 104 further comprises an upper surface 112 and a lower surface 114 that may be of equal or different dimensions. Lower surface 114 may have one or more recesses and projections.

Top part 104 is typically shaped and sized for direct contact with base part 102. Top part 104 may also include features for aligning top part 104 with base part 102 in one or more suitable positions. Features may include elevation and/or dimensional changes of an outer rim that are complementary to elevation and/or dimensional changes of lower surface 114. Alignment of parts 112 and 114, as shown in FIG. 14, is provided by one or more alignment pins 116 that extend from the lower surface 114 of top part 104 and are received in cooperating holes 118 in base part 102. Alignment pins 116 and other features may be formed integral with top part 104 or provided as additional elements as needed. Alignment holes may be continuous through the mold, e.g., present on both the upper and lower surfaces of top part 104 and base part 102 or may be formed intersecting only one of the mold part surfaces. Suitable alternate location or alignment features include stops, pins, screw, plugs, and clips capable of extending from at least a portion of top part 104 to at least a portion of base part 102 or of fitting into location or alignment holes, such as holes 118.

Referring further to FIGS. 14, 15, and 16, base part 102 generally comprises a bottom wall 120 (which may be separable), an upward facing continuous, planar face or rim 122, at least one interior base chamber or cavity 124 for receiving one or more hot pour materials and delimited by an inner rim 126 and a base surface 128. Outer face or rim 122 may be a different elevation than inner rim 126 and inner rim 126 is typically a different elevation than base surface 128. Base surface 128 and/or inner rim 122 may additionally comprise one or more projections (e.g., raised or debossed portions) as well as one or more recesses (e.g., sunken or embossed portions) with respect to a suitable baseline.

Inner rim 126 and base surface 128 may be further shaped and sized to forts a continuous and elastically deflectable removable member 130. Removable member 130 is dimensioned for close fitting contact in a recess 107 formed in base part 102 and is typically pan shaped. The lower surface of removable member 130 is typically a different elevation than that of bottom wall 120 of FIGS. 14, 15, and 16. Removable member 130 is retained in recess 107 by removable bottom wall 120. An alternative configuration is depicted in FIG. 18 showing a base member bottom wall [320] *328* with reference to removable member 330. Sidewalls of removable member 130 may be generally planar as shown for outer sidewall 150 in FIG. 14, or non-planar as shown in FIG. 18 for sidewall 350 of removable member 330.

A mold of the present invention may also include insert 144 shaped and sired to fit within cavity 124 of mold 100, as shown in FIGS. 15 and 16. Insert 144 may include a grid 146 patterned for multi-pour processing and/or multi-elevational pours or to reinforce the resulting hot pour product. Grid 146 of insert 144 may serve as support for a hot pour material. All or portions of grid 146 may lie within a hot pour material depending on desirability. Grid 146 may be any desired shape and/or elevation, as required, portions of which may serve as solid surfaces.

FIGS. 15 and 16 illustrate how bottom wall 120 of base part 102 is secured to base part member 136 by conventional machine screws 152. Screws 152 are not essential and may also be replaced by alternative alignment means known to one of ordinary skill in the art.

FIG. 16 also illustrates how alignment pins 116 pass from top part 104 through a portion of base part 102. In this embodiment, alignment pins 116 pass into bores 118 in base part member 136 of base part 102. Alignment pins 116 are not essential and may also be replaced by alternative alignment means known to one of ordinary skill in the art. FIG. 15 and FIG. 16 illustrate an opening or space 154 in bottom wall 120 that is dimensionally smaller in diameter than that of removable member 130, but large enough to allow a conduit 155 or other pressure fluid source to be operably in communication with a lower portion of base part 102, such as bottom wall 128 of removable member 130. When required, conduit 155 is operable to conduct pressure fluid to or from space 154 to flex member 130 to assist in the release of a hot pour material from mold 100 of the present invention.

In the embodiments depicted in FIGS. 15 and 16, insert 144 is disposed above removable member 130. Insert 144 may further comprise one or more protections or recesses at any of its upper or lower surfaces. Accordingly, insert 144 may have any of a number of alternative positions as it resides in base part [104] *102*. All or portions of insert 144 may be visible or invisible after filling space or cavity 124 with one or more hot pour materials. For example, FIGS. 15 and 16, show gap 156 above insert 144 and below top part 104. All or portions of gap 156 will be filled with one or more hot pour materials, as desired.

Referring now to FIG. 17, yet another mold 200 of the present invention is depicted having a shaped tap part 204 and shaped base part 202. Top part 204 comprises perimeter wall 206 and at least one pour space 208 defined by at least one perimeter surface 210. Surface 210 may be shaped or have one or more angles as desired as well as comprise one or more recesses and/or projections. Top part 204 further comprises an upper surface 212 and a lower surface 214 that may be parallel and of equal or different dimensions. Lower surface 214 may have one or more recesses and/or projections.

Base part 202 of mold 200 comprises a downward facing surface or bottom wall 220, an upward facing continuous, planar surface or outer rim 222, at least one interior base chamber or cavity 224 for receiving one or more hot pour materials and a recess or inner rim 226 delimited by a base surface 228. Outer rim or surface 222 may be a different elevation than base surface 228. Base surface 228 and/or inner rim 226 may additionally comprise one or more projections (e.g., raised or debossed portions) and/or as one or more recesses (e.g., sunken or embossed portions) with respect to a baseline 234. Base part 202 further includes one or more passages 254 operable to be connected to a pressure fluid source by way of a conduit 255. Because base part 202 is depicted without and does not include a removable member, any pressure fluid source in communication with cavity 224 by way of passages 254 and conduit 255 will be operable with conduit 255 to assist in the release of a hot pour product from mold 200. Release typically occurs by applying pressure fluid to a downward facing surface of such formed product.

In mold 200, placement of top part 204 with base part 202 include alignment pins 216, shown passing from top part 204 into alignment holes 217 in base part 202. Alignment pins 216 are not essential and may also be replaced by alternative alignment means known to one of ordinary skill in the art.

Mold 200 may have an insert 244 disposed therein, shaped and sized to fit within cavity 224. Insert 244 is similar to insert 144 and typically includes a patterned grid, at least one solid surface, and/or one or more recesses and/or projections. The solid surface may be of a single elevation or multi-elevational and may encompass all or a portion of insert 244. Presence of a grid and/or the at least one solid surface are especially suitable for multi-pour processing and/or multi-elevational pours. In FIG. 17, insert 244 is shown to reside above and engaged with base surface 228; however, alternative positions are suitable. A small gap 256, shown above insert 244 and below pour space 208 in FIG. 17, is dependent on the position and geometry of the insert. When desired, gap 256 is filled entirely or in part with a hot pour material. As such, all or a portion of insert 244 may be visible after addition of one or more hot pour materials to form a hot pour product similar to HPP 50, for example.

Figure 19:
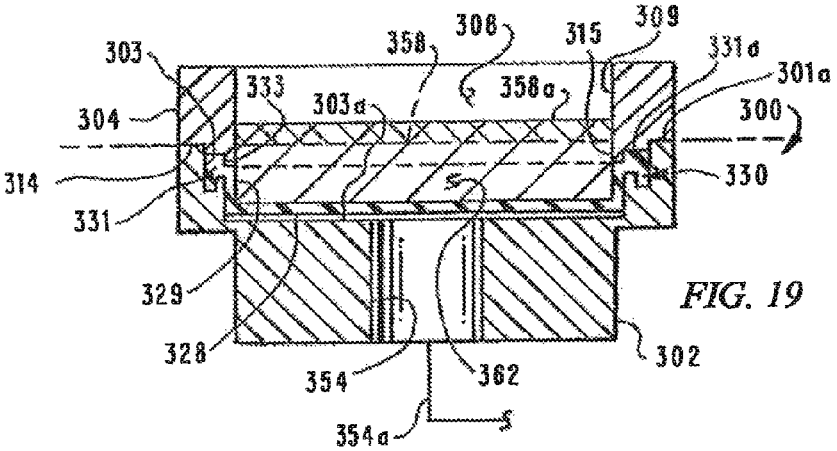
FIG. 19 is a section view taken from line 19-19 of FIG. 18.

In another embodiment of the present invention depicted in FIGS. 18 and 19, multiple pour spaces 308 are revealed and formed spaced apart in a top part 304 of a shaped mold 300. Mold 300 permits multiple hot pour products to be prepared by a single mold. Mold 300 comprises features and elements similar to those described for mold 2, mold 100 and mold 200 of the present invention. For example, mold 300 includes shaped top part 304 and cooperable shaped base part 302. Engagement of top part 304 and base part 302 provides for multiple cavities, each cavity capable of receiving at least one hot pour material. Customized hot pour products are prepared in mold 300 from, for example, one or more recesses and/or projections formed on portions of top part 304 and/or portions of base part 302, such as on surfaces 310 or 314 of top part 304 or on base surface [328] of base part 302. In addition, mold 300 is capable of receiving an insert shaped and/or patterned as desired.

Figure 20:
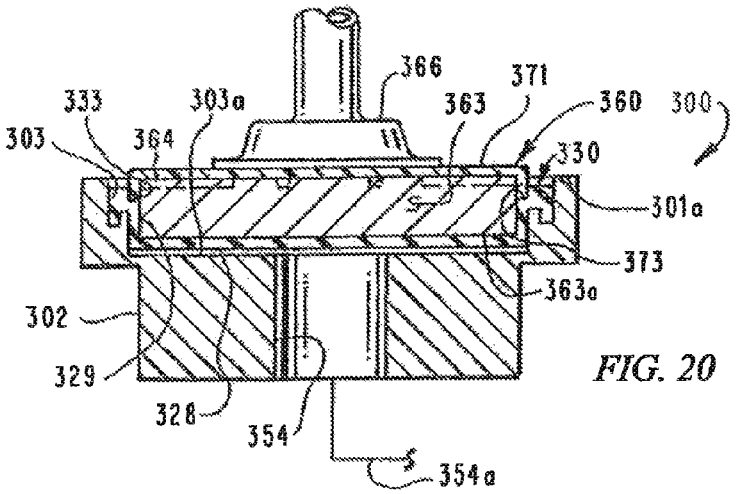
FIG. 20 is a section view taken from the same line as FIG. 19 but with the top part removed.

As depicted in FIG. 18, base part 302 supports spaced apart removable members 310 with each associated with each pour space 308. Each removable member 330 is characterized as a shallow pan shaped member having a bottom wall 328 (FIG. 19), an upstanding perimeter side wall 329 and an outwardly projecting perimeter flange 331. Flange 331 includes a perimeter recess 333 and intersecting sidewall 329. Flange 331 also includes a continuous or perimeter depending rim portion 335 spaced from sidewall 328. Mold bottom part 302 is provided with spaced apart recesses 303 that are shaped to receive the member 330 in snug fitting relationship as shown in FIGS. 19 and 20. Each recess 303, in receipt of member 330 includes a passage or space 354 that opens to recess 303 and is operably connected to a conduit 354a adapted to be connected to a source of pressure fluid, not shown. Removable member 330 is typically formed of a resilient flexible polymer material and is responsive to pressure fluid acting on bottom wall 328 and within a space between bottom wall 328 and recess bottom wall 303a to flex and release a molded product formed therein.

Neither holes nor alignment pins are required for placement and/or alignment of top part 304 with base part 302 of mold 300 as depicted in FIG. 19. A downward facing planar lower surface 314 of top part 304 includes stepped depending perimeter flanges 315 (one shown in FIG. 19) projecting therefrom and defining with interior walls 309, the pour space 308. Flange 315 nests in recess 333 and rests on flange surface 331a, which is disposed slightly below a planar surface and parting line 301a of mold part 302. Mold parts 302 and 304 are aligned by the aforementioned flange 315 and/or may be secured together by various additional or alternate means, including cooperating magnets 300b and 300c disposed on the respective mold parts 302 and 304 (FIG. 18). Mold parts 302 and 304 may be placed in an apparatus, not shown, for an automated or somewhat automated process as described herein.

Generally, a process of introducing a hot pour material such as a cosmetic article or the like, to any mold of the present invention comprises steps as previously described or as further disclosed herein. The process includes setting up a mold having a top part and base part well engaged, adding at least one hot pour material to the mold through one or more pour spaces to a suitable fill level, and allowing the at least one hot pour material to cool to a hot pour consistency using cooling techniques known to one of ordinary skill in the art. The mold top part and base part when engaged form at least one cavity to be filled with the at least one hot pour material. The one or more pour spaces of the top part may be as large or as small as desired. Pour spaces may be combined with one or more projections and/or recesses on suitable portions of the top part that will form customizable portions on a first surface of a product upon removal of the top part of the mold. Fill level demarcations are not necessary in the cavity or mold. On the other hand, one or more recesses, projections, solid surfaces and/or elevations in the base part of the mold or on an insert provided therein may be suitably used as fill levels, when desired.

Customization of a hot pour product of the present invention is provided by a mold having one or more shapes, recesses, projections, solid (base) surfaces, inserts, removable members and any combination thereof. Each of the recesses, projections, removable members, solid surfaces and/or inserts may be shaped of its own accord and be of identical or differing elevations depending on the desired outcome for a customized hot pour product. When more than one hot pour material is provided to a mold, the more than one hot pour material is poured simultaneously or is poured at different stages—in which case a first hot pour material is allowed to cool before any additional hot pour material is provided to the mold. Such staging may be repeated as often and in any combination desired to achieve the final customized hot pour product. All or a portion of pour spaces may be used at any one time when more than one pour space is provided with a mold.

Molds of the present invention having one or more inserts within one or more cavities do not require the same number of inserts in each cavity. When multiple cavities are present, some cavities may have no insert at all. The one or more inserts are typically placed before introduction of a hot pour material when only one hot pour material is poured. When more than one hot pour material is poured, one or more inserts are placed either before or after introduction of a first hot pour material. Accordingly, multiple inserts may be placed in any one cavity and at any stage of a hot pour process to achieve a final customized hot pour product. The one or more inserts may further include one or more fill level demarcations, wherein demarcations are provided by one or more recesses, projections and/or solid surfaces. The one or more fill levels may each be identical or of different elevations relative to an indicated baseline, depending on the desired end product.

After all hot pour materials are poured and cooled, the top part is removed carefully. In one embodiment, the top part is moved upward relative to the base part. Alternate removal methods are also suitable with this invention. Removal of the top part provides for a first exposed surface which is followed by release of the hot pour product from the base part to provide a second exposed surface. Removal of the top part and release of the base part may be by hand or via mechanical intervention, such as introduction of pressure fluid through one or more spaces or pressure fluid passages. Removal and release may also be incorporated in an automated process. When desired, a first receptacle is placed in contact with a portion of the first exposed surface before release of the hot pour product from the base part. A second receptacle may also be placed in contact with either a portion of the first receptacle, the first exposed surface, combinations thereof, or the second exposed surface.

As shown in FIG. 19, typically a hot pour material 362 is filled to a desired fill level 358. Fill level 358 is coplanar with surface 301a but may be above or below outer rim surface 301a and/or inner rim surface 310 of top part 304. As further depicted in FIG. 19, a fill level 358a is above both outer rim surface 301a and rim surface 311a. Top part 304 may be removed by mechanical means or by hand once the hot pour material has cooled revealing a first exposed surface 364. When top part 364 includes projections and/or recesses on its lower surface, first exposed surface 364 will reflect a mirror image of such projections and/or recesses. If hot pour material is poured to fill level 358a, excess material may be removed down to level 358, for example, after separation of parts 302 and 304. Additionally or alternatively, non-desirable irregularities on first exposed surface 364 may be removed or leveled by a leveling means known to one of ordinary skill in the art.

Contact of a receptacle to the cooled hot pour product 363 (FIG. 20) formed of hot pour material 362, may also be performed mechanically or by hand. Mechanical release of hot pour product 363 from base part 302 may occur as shown in FIG. 20. Initially a first receptacle 360 is placed on and in contact with hot pour product 363. Receptacle 360 may contact the entire upward facing first exposed surface 364 of hot pour product 363, as shown in FIG. 19, or limited portions of first exposed surface 364, such as its outer perimeter, not shown. In FIG. 20, hot pour product 363 in contact with receptacle 360 is removed from base part 302 by means of lift 366 engaged with receptacle 360 and comprising, for example, a suction cup, as shown. Additionally or as an alternative, pressure fluid may be introduced in or evacuated from space 354 to act on removable member 330.

Separation of base part 302 from member 330 may occur and leave removable member 330 in contact with hot pour product 363. Removable member 330 is released from hot pour product 363 to reveal a second exposed surface. Such release may be by additional mechanical means or by hand using methods known to one of ordinary skill in the art, or may occur while member 330 remains in base part 302. Removable member 330 if having one or more recesses and/or projections will provide mirror images of such recesses and/or projections, on its complementary or second exposed surface 363a of hot pour product 363 when removable member 330 is detached.

Receptacle 360 (FIGS. 20 and 21) includes a planar bottom wall 371, a perimeter rim 373 and one or more inwardly extending bosses 375 and 377 that may be embedded in product 363 when receptacle 360 is placed in the position shown in FIG. 20 and firmly engaged with product 363. As depicted, receptacle 360 is dimensioned to fit snugly but releasably in recess 333 (FIG. 20) and to fit snugly over and engage with hot pour product 363. Product 363 is thus easily removed from mold base part 302 by mechanism 366, also in response to flexing of member 330, as described herein.

A hot pour product in contact with a first receptacle may be introduced or transferred to a second receptacle. The second receptacle may be in contact with the first receptacle as shown in FIG. 11B or in contact with a second exposed surface or upper surface 78 of the hot pour material as shown in FIG. 11C. Contact surfaces of the first receptacle, second receptacle and hot pour product may be contiguous with one another or of varying elevations, just as the hot pour product, itself, may be of varying elevations as a result of the features included and described herein. Accordingly, hot pour products produced by molds and methods provided herein typically include customized surfaces on all or part of upper surface 78 and lower surface 80 of HPP 50, for example (FIG. 11A, 12 or 13).

While particular embodiments of the invention and method steps of the invention have been described herein, additional alternatives not specifically disclosed but known in the art are intended to fall within the scope of the invention. Thus, it is understood that other embodiments and applications of the present invention will be apparent to those skilled in the art without departing from the scope and spirit of the appended claims and drawings.

What is claimed is:

1. A process for preparing a customized cosmetic product comprising the steps of:

providing a mold assembly for casting hot pour material in a fluid state, the mold assembly having two separable parts, a first part being a base part with a plurality of spaced apart cavities extending [therethrough] *through a bottom surface of the base part* and a second part being a top part that engages the base part and having a plurality of pour spaces disposed along its top surface;

suspending removable patterned inserts within said spaced apart cavities, said inserts defining different customized patterns or designs; *and* applying hot pour material into the removable patterned inserts through the pour space, *wherein the top part and base part further comprise one or more projections, one or more recesses, and combinations thereof.*

2. The process of claim 1, wherein the process is automated.

[3. The process of claim 1, wherein the top part and base part further comprise one or more projections, one or more recesses, and combinations thereof.]

4. [The process of claim 1 further comprising] *A process for preparing a customized cosmetic product comprising the steps of:*

*providing a mold assembly for casting hot pour material in a fluid state, the mold assembly having two separable parts, a first part being a base part with a plurality of spaced apart cavities extending through a bottom surface of the base part and a second part being a top part that engages the base part and having a plurality of pour spaces disposed along its top surface;*

*suspending removable patterned inserts within said spaced apart cavities, said inserts defining different customized patterns or designs;*

*applying hot pour material into the removable patterned inserts through the pour space; and* separating the top part from the base part by moving the top part relative to the base part such that a portion of the hot pour material is in contact with the base part and wherein another portion of the hot pour material provides a first exposed surface.

5. [The process of claim 1,] *A process for preparing a customized cosmetic product comprising the steps of:*

*providing a mold assembly for casting hot pour material in a fluid state, the mold assembly having two separable parts, a first part being a base part with a plurality of spaced apart cavities extending through a bottom surface of the base part and a second part being a top part that engages the base part and having a plurality of pour spaces disposed along its top surface;*

*suspending removable patterned inserts within said spaced apart cavities, said inserts defining different customized patterns or designs;*

*applying hot pour material into the removable patterned inserts through the pour space,* wherein the hot pour material, when cooled, is placed in a receptacle.

6. [The process of claim 1, further comprising] *A process for preparing a customized cosmetic product comprising the steps of:*

*providing a mold assembly for casting hot pour material in a fluid state, the mold assembly having two separable parts, a first part being a base part with a plurality of spaced apart cavities extending through a bottom surface of the base part and a second part being a top part that engages the base part and having a plurality of pour spaces disposed along its top surface;*

*suspending removable patterned inserts within said spaced apart cavities, said inserts defining different customized patterns or designs;*

*applying hot pour material into the removable patterned inserts through the pour space; and* releasing the hot pour material, when cooled, from the base part, the hot pour material, when cooled, having a pattern corresponding to the insert.

7. [The process of claim 1,] *A process for preparing a customized cosmetic product comprising the steps of:*

*providing a mold assembly for casting hot pour material in a fluid state, the mold assembly having two separable parts, a first part being a base part with a plurality of spaced apart cavities extending through a bottom surface of the base part and a second part being a top part that engages the base part and having a plurality of pour spaces disposed along its top surface;*

*suspending removable patterned inserts within said spaced apart cavities, said inserts defining different customized patterns or designs;*

*applying hot pour material into the removable patterned inserts through the pour space,* wherein the top part and base part include cooperating alignment means.

8. The process of claim 5, wherein after placing in a receptacle there is formed a second exposed surface [have] *having* varying surface elevations relative to the receptacle.

9. The process of claim 1, wherein the step of applying is repeated one or more times.

10. [The process of claim 1,] *A process for preparing a customized cosmetic product comprising the steps of:*

*providing a mold assembly for casting hot pour material in a fluid state, the mold assembly having two separable parts, a first part being a base part with a plurality of spaced apart cavities extending through a bottom surface of the base part and a second part being a top part that engages the base part and having a plurality of pour spaces disposed along its top surface;*

*suspending removable patterned inserts within said spaced apart cavities, said inserts defining different customized patterns or designs;*

*applying hot pour material into the removable patterned inserts through the pour space,* wherein the hot pour material, when cooled, is released from the base part by pressure.

11. A process for preparing a customized cosmetic product comprising the steps of:

providing a mold assembly for casting hot pour material in a fluid state, the mold assembly having a first part being a top part and a second part being a base part having a plurality of spaced apart cavities extending [therethrough] *through a bottom surface of the base part,* each cavity containing at least one insert, wherein the top part has a plurality of pour spaces disposed along a top surface, wherein the at least one insert has a pattern on its bottom surface, is removable and defines customized patterns or designs; *and* applying hot pour material into the at least one removable patterned insert through the pour space and allowing the hot pour material to cool[; and], wherein the at least one removable patterned insert is suspended within a respective one of the spaced apart cavities *and the top part and base part further comprise one or more removable members, projections, recesses, and combinations thereof.*

12. The process of claim 11, wherein the process is automated.

[13. The process of claim 11, wherein the top part and base part further comprise one or more removable members, projections, recesses, and combinations thereof.]

14. [The process of claim 11 further comprising] *A process for preparing a customized cosmetic product comprising the steps of:*

*providing a mold assembly for casting hot pour material in a fluid state, the mold assembly having a first part being a top part and a second part being a base part having a*

*plurality of spaced apart cavities extending through a bottom surface of the base part, each cavity containing at least one insert, wherein the top part has a plurality of pour spaces disposed along a top surface, wherein the at least one insert has a pattern on its bottom surface, is removable and defines customized patterns or designs;*

*applying hot pour material into the at least one removable patterned insert through the pour space and allowing the hot pour material to cool, wherein the at least one removable patterned insert is suspended within a respective one of the spaced apart cavities; and* placing at least one receptacle in contact with the hot pour material before releasing the hot pour material into the receptacle.

15. The process of claim 14, wherein the at least one receptacle further comprises a container, article, case, compact, godet, and combinations thereof made of a material selected from the group consisting of a hardened polymer, polymer blend, glass, fibrous material, metal and combinations thereof.

16. [The process of claim 11, wherein] *A process for preparing a customized cosmetic product comprising the steps of:*

*providing a mold assembly for casting hot pour material in a fluid state, the mold assembly having a first part being a top part and a second part being a base part having a plurality of spaced apart cavities extending through a bottom surface of the base part, each cavity containing at least one insert, wherein the top part has a plurality of pour spaces disposed along a top surface, wherein the at least one insert has a pattern on its bottom surface, is removable and defines customized patterns or designs;*

*applying hot pour material into the at least one removable patterned insert through the pour space and allowing the hot pour material to cool, wherein the at least one removable patterned insert is suspended within a respective one of the spaced apart cavities and* the top part and base part include cooperating alignment means.

17. The process of claim 14, wherein after releasing the hot pour material into the receptacle, the hot pour material when cooled has a pattern corresponding to the insert.

18. The process of claim 12, wherein the step of applying is repeated with the same or different hot pour material.

19. [Customized] *A customized* cosmetic product creation apparatus, comprising:

a mold assembly comprising at least two parts, a first part being a base part having top and bottom surfaces with a plurality of spaced apart cavities extending through said top and bottom surfaces;

a second part being a top part having top and bottom surfaces and engaging the top surface of said base part along the bottom surface of said top part;

a plurality of pour spaces disposed along the top surface of said top part respectively aligned, and in fluid communication with, the spaced apart cavities of said base part; *and* removable, replaceable patterned inserts respectively suspended within each of said spaced apart cavities for receiving hot pour materials, said inserts defining different customized patterns or designs, whereby the hot pour materials, within the confines of said patterned inserts, when cooled, form cosmetic products having corresponding patterns or designs produced on at least one surface of the cosmetic product formed from the same mold assembly[;], and the hot pour materials inserted into said removable patterned inserts through said pour spaces, *and said hot pour materials are of respectively different composition.*

[20. The apparatus of claim 19 whereby said hot pour materials are of respectively different compositions.]

[21. The apparatus of claim 19 whereby said hot pour materials are of a same composition.]

22. [The apparatus of claim 19,] *A customized cosmetic product creation apparatus, comprising:*

*a mold assembly comprising at least two parts, a first part being a base part having top and bottom surfaces with a plurality of spaced apart cavities extending through said top and bottom surfaces;*

*a second part being a top part having top and bottom surfaces and engaging the top surface of said base part along the bottom surface of said top part;*

*a plurality of pour spaces disposed along the top surface of said top part respectively aligned, and in fluid communication with, the spaced apart cavities of said base part; and*

*removable, replaceable patterned inserts respectively suspended within each of said spaced apart cavities for receiving hot pour materials, said inserts defining different customized patterns or designs, whereby the hot pour materials, within the confines of said patterned inserts, when cooled, form cosmetic products having corresponding patterns or designs produced on at least one surface of the cosmetic product formed from the same mold assembly, and the hot pour materials inserted into said removable patterned inserts through said pour spaces,* wherein the top part and base part further comprise customizable portions including one or more projections, one or more recesses, and combinations thereof.

23. [The apparatus of claim 19 further comprising] *A customized cosmetic product creation apparatus, comprising:*

*a mold assembly comprising at least two parts, a first part being a base part having top and bottom surfaces with a plurality of spaced apart cavities extending through said top and bottom surfaces;*

*a second part being a top part having top and bottom surfaces and engaging the top surface of said base part along the bottom surface of said top part;*

*a plurality of pour spaces disposed along the top surface of said top part respectively aligned, and in fluid communication with, the spaced apart cavities of said base part;*

*removable, replaceable patterned inserts respectively suspended within each of said spaced apart cavities for receiving hot pour materials, said inserts defining different customized patterns or designs, whereby the hot pour materials, within the confines of said patterned inserts, when cooled, form cosmetic products having corresponding patterns or designs produced on at least one surface of the cosmetic product formed from the same mold assembly, and the hot pour materials inserted into said removable patterned inserts through said pour spaces; and* first receptacles for housing the cosmetic products when cooled.

24. The apparatus of claim 23 further comprising second receptacles for housing the first receptacles.

25. [The apparatus of claim 19 further comprising] *A customized cosmetic product creation apparatus, comprising:*

*a mold assembly comprising at least two parts, a first part being a base part having top and bottom surfaces with a plurality of spaced apart cavities extending through said top and bottom surfaces;*

*a second part being a top part having top and bottom surfaces and engaging the top surface of said base part along the bottom surface of said top part;*

*a plurality of pour spaces disposed along the top surface of said top part respectively aligned, and in fluid communication with, the spaced apart cavities of said base part;*

*removable, replaceable patterned inserts respectively suspended within each of said spaced apart cavities for receiving hot pour materials, said inserts defining different customized patterns or designs, whereby the hot pour materials, within the confines of said patterned inserts, when cooled, form cosmetic products having corresponding patterns or designs produced on at least one surface of the cosmetic product formed from the same mold assembly, and the hot pour materials inserted into said removable patterned inserts through said pour spaces; and* a cooperating alignment means for aligning the top part and the base part.

26. [The apparatus of claim 19.] *A customized cosmetic product creation apparatus, comprising:*

*a mold assembly comprising at least two parts, a first part being a base part having top and bottom surfaces with a plurality of spaced apart cavities extending through said top and bottom surfaces;*

*a second part being a top part having top and bottom surfaces and engaging the top surface of said base part along the bottom surface of said top part;*

*a plurality of pour spaces disposed along the top surface of said top part respectively aligned, and in fluid communication with, the spaced apart cavities of said base part; and*

*removable, replaceable patterned inserts respectively suspended within each of said spaced apart cavities for receiving hot pour materials, said inserts defining different customized patterns or designs, whereby the hot pour materials, within the confines of said patterned inserts, when cooled, form cosmetic products having corresponding patterns or designs produced on at least one surface of the cosmetic product formed from the same mold assembly, and the hot pour materials inserted into said removable patterned inserts through said pour spaces,* wherein the cosmetic product when cooled has varying surface elevations.

27. [Customized] *A customized* cosmetic product creation apparatus, comprising:

a mold assembly comprising at least two separable parts, a first part being a base part having top and bottom surfaces with a plurality of spaced apart cavities extending through said top and bottom surfaces;

a second part being a top part having top and bottom surfaces and engaging the top surface of said base part along the bottom surface of said top part;

a plurality of pour spaces disposed along the top surface of said top part respectively aligned, and in fluid communication with, the spaced apart cavities of said base part; and removable, replaceable patterned inserts respectively suspended within each of said spaced apart cavities for receiving hot pour material, said inserts defining customized patterns or designs, whereby hot pour material, within the confines of said patterned inserts, when cooled, form cosmetic products having different patterns or designs produced from the same mold assembly on an upper surface of the cosmetic products.

28. The apparatus of claim 27 wherein said hot pour material in each insert is of a different composition.

29. The apparatus of claim 27 wherein said hot pour materials in each insert is of a same composition.

30. The apparatus of claim 27, wherein the top part and base part further comprise customizable portions including one or more projections, one or more recesses, and combinations thereof.

31. The apparatus of claim 27 further comprising first receptacles for housing the cosmetic products when cooled.

32. The apparatus of claim 31 further comprising second receptacles for housing the first receptacles.

33. The apparatus of claim 27 further comprising a cooperating alignment means for aligning the top part and the base part.

34. The apparatus of claim 27, wherein the cosmetic products when cooled have varying surface elevations.

[35. A mold for creating a cosmetic product from a hot pour material, comprising:

a base part having top and bottom surfaces, the base part defining at least one aperture therethrough;

a top part having top and bottom surfaces, the top surface of said base part engaging the bottom surface of said top part, the top part defining at least one pour space aligned with the at least one aperture of the base part; and a patterned insert suspended within the at least one aperture, the patterned insert defining a customized pattern and being configured to receive a hot pour material poured through the pour space to form a cosmetic product having a product pattern corresponding to the customized pattern.]

* * * * *